US011890631B2

(12) United States Patent
Hofman

(10) Patent No.: US 11,890,631 B2
(45) Date of Patent: Feb. 6, 2024

(54) HANDHELD SHOWERHEAD AND WALL MOUNT ASSEMBLY

(71) Applicant: ETL, LLC, Sparks, NV (US)

(72) Inventor: David Hofman, Sparks, NV (US)

(73) Assignee: ETL, LLC, Sparks, NV (US)

( * ) Notice: Subject to any disclaimer, the term of this patent is extended or adjusted under 35 U.S.C. 154(b) by 101 days.

(21) Appl. No.: 17/563,984

(22) Filed: Dec. 28, 2021

(65) Prior Publication Data

US 2023/0201857 A1 Jun. 29, 2023

(51) Int. Cl.
*B05B 15/62* (2018.01)
*E03C 1/04* (2006.01)

(52) U.S. Cl.
CPC ............ *B05B 15/62* (2018.02); *E03C 1/0408* (2013.01)

(58) Field of Classification Search
CPC .......... B05B 15/62; B05B 1/18; E03C 1/0408
USPC ............................ 248/75, 314, 229.1, 316.7
See application file for complete search history.

(56) References Cited

U.S. PATENT DOCUMENTS 4,719,654 A * 1/1988 Blessing ................... E03C 1/06 4/596
6,123,308 A * 9/2000 Faisst ...................... E03C 1/066 248/316.1
2009/0277522 A1* 11/2009 Huang .................. E03C 1/0408 137/876

* cited by examiner

*Primary Examiner* — Qingzhang Zhou
(74) *Attorney, Agent, or Firm* — One LLP

(57) ABSTRACT

An improved showerhead assembly is provided for securely holding a handheld showerhead within a mount. The handheld showerhead includes an elongate handle and a showerhead face including one or more nozzles for spraying water. The mount includes a tubular section for receiving the handheld showerhead's handle, and a mounting surface which affixes to an underlying surface such as shower stall wall. The handle includes a circumferential groove and the mount includes a "C" shaped locking clip capable of locking within the handle's groove.

7 Claims, 6 Drawing Sheets

HANDHELD SHOWERHEAD AND WALL MOUNT ASSEMBLY

BACKGROUND OF THE INVENTION

The present invention relates to showerheads. More particularly, the present invention relates to a mounting apparatus for handheld showerheads.

Showerheads are commercially available in numerous designs and configurations for use in showers, faucets, spas, sprinklers and other personal and industrial systems. The vast majority of showerheads include spray heads which may be categorized as being either stationary or oscillating and have either fixed or adjustable openings. Stationary spray heads with fixed jets are the simplest constructions consisting essentially of a central channel connected to one or more spray nozzles directed to produce a constant pattern. The stationary spray showerheads cause water to flow through the construction to contact essentially the same points on a user's body in a repetitive fashion.

A handheld showerhead assembly typically includes a hollow handle connected to a water supply by a flexible rubber hose. The handle has a proximal end which typically has a threaded inlet for connecting to a rubber hose. Meanwhile, at the handle's distal end, the showerhead assembly includes a showerhead including a plurality of nozzles for ejecting water. Typically, the handle and showerhead face are angled relative to one another so that water is ejected at approximately 90° relative to the handle's longitudinal axis.

Advantageously, the showerhead handle allows users to manipulate the spray nozzles into various positions and alignment to assist in the cleaning process. Unfortunately, though handheld showerheads provide many advantages compared to their fixed showerhead counterpart, handheld showerheads still suffer from several disadvantages. For example, a handheld showerhead can be bumped from its mounting apparatus. Furthermore, handheld showerheads are often found on mobile vehicles including recreational vehicles and boats. Vibration caused by driving the vehicles can cause the handheld showerhead to dislodge from its mount.

Many showerhead assemblies include handheld showerheads which insert or slide into a given slot or bracket. Examples of such constructions are disclosed in U.S. Pat. Nos. 7,966,677, 7,665,676, and U.S. Patent Application Publication No. 2019/0176170. Unfortunately, these retention mechanisms may also be unsecure, causing the handheld showerhead to inadvertently release from its desired attached position.

Attempts have been made to more securely hold a handheld showerhead within a mount. For example, U.S. Pat. No. 9,919,331 and Chinese Patent No. 106076677 describe handheld showerhead assemblies that utilize a magnet attachment mechanism. In these embodiments, the magnet retention mechanism may be unsecure, causing the handheld showerhead to inadvertently release from its desired attached position.

Thus, it would be advantageous to provide a showerhead assembly that included a firm fastener which would allow the user to manipulate or change the angle of the handheld showerhead.

SUMMARY OF THE INVENTION

The present invention addresses the aforementioned disadvantages by providing an improved handheld showerhead assembly which includes an improved mounting structure for supporting a handheld showerhead. The showerhead assembly includes a traditional handheld showerhead including a primary showerhead having a plurality of nozzles for expelling water such as within a shower. The handheld showerhead further includes a hollow handle with a proximal end which preferably is threaded for connecting to a flexible hose. The handle is elongate so as to define a longitudinal axis, and preferably, the distal end of the handle affixes to the showerhead at an angle, such as 45° to 90°. Additionally, the handheld showerhead includes a channel having an inlet for receiving water for being expelled from the showerhead nozzles. Various channel, conduit, and nozzle constructions can be determined by those skilled in the art for diverting water from the inlet to the showerhead's nozzles. In the preferred embodiment, the showerhead includes a controller knob for selecting a desired shower spray pattern.

Moreover, the showerhead assembly of the present invention includes a showerhead mount for receiving the proximal end of the hollow handle. The mount includes a rear mounting surface which affixes to an underlying surface within the shower stall. In one embodiment, the showerhead assembly's mounting surface is preferably planar for engaging and affixing to the rear planar wall in a shower stall. In alternative embodiment, the mount has an inlet which preferably is threaded for connecting to a water supply such as a male threaded pipe projecting from a shower stall wall. For this embodiment, the mount's rear mounting surface includes female threads for affixing to the end of the pipe, and the mount includes a housing having a central channel that delivers water to a hose outlet.

The mount may be affixed to the underlying surface by any fastener as can be determined by one skilled in the art. In preferred embodiments, the fastener comprises one or more screws which project through holes in the mounting surface. Alternative preferred fasteners include adhesives, or threaded fasteners. Where the mount includes an inlet and an outlet for the passage of water to the hose, the fastener may include female threads sized to affix to the male threads of a water pipe.

The mount further includes a vertically extending tubular section for receiving the proximal end of the showerhead handle. Preferably, the handle's proximal end is tapered, and the interior of the mount's tubular section has a similar taper to receive and hold the handle's proximal end. The tubular section includes an opening which extends vertically the length of the tubular section's sidewall so as to give the tubular section a generally "C" shaped cross section. The opening's width is wider than the width of the hose so that the hose can pass through the tubular section's opening. Preferably, the mount's tubular section is affixed to the mounting surface by a ball joint so as to allow tubular section (and handheld showerhead) to swivel about the ball joint's center.

The tapered shapes of the handle's proximal end and tubular section allows the showerhead's handle to rest within the tubular section so that the handheld showerhead will not disengage from the mount's tubular section without additional force exerted on the handheld showerhead. However, to prevent the handheld showerhead from inadvertently disengaging from the mount, such as due to vibration or an inadvertent bump to the handheld showerhead, the showerhead assembly includes an additional locking mechanism which prevents the handheld showerhead from dislodging from the tubular section.

The locking mechanism includes a groove that extends circumferentially around the handle near the handle's proximal end. In addition, the locking mechanism includes a locking clip affixed to the tubular section. The tubular section includes a circumferential slot which extends around the exterior of said tubular section. In addition, the tubular section includes two holes which project entirely through tubular section at the ends of the circumferential slot. The locking clip is substantially "C" shaped and sized and positioned to reside within the tubular section's circumferential slot. Furthermore, the clip includes two prongs with each of the two prongs extending radially inward from the ends of the "C" shaped clip through a respective tubular section hole to terminate within the interior of tubular section as an engagement surface.

The showerhead's handle and locking clip are constructed so that when the tapered proximal end of the handle is placed within the mount's tapered tubular section, the clip's engagement surfaces project into the handle's groove. Preferably, the prongs' engagement surfaces are arcuate and have a concave shape with a radius of curvature that is the same as the radius of curvature of the convex shape of the surface within the handle's groove. Also preferable, the thickness of the groove tapers from wide to narrow from the exterior of the groove to its interior, and the thickness of the prongs' engagement surfaces have a corresponding taper of wide to thin toward their engagement surfaces.

The clip, including its "C" shaped structure and prongs, is preferably made of one piece of a flexible material so as to allow the clip to function as a spring so as to allow the clip's prongs to bias outwardly when the showerhead's handle is inserted into the tubular section or removed from the tubular section. The term "flexible material" is intended to have its ordinary meaning as "capable of bending easily without breaking" with the manual insertion or removal of the showerhead's handle from the tubular section.

Advantageously, the showerhead assembly provides a handheld showerhead that is secure within a mounting assembly.

Also advantageously, the showerhead assembly does not require expensive modifications to the traditional shower stall architecture.

Other features and advantages of the present invention will be appreciated by those skilled in the art upon reading the detailed description which follows with reference to the drawings.

DETAILED DESCRIPTION OF THE INVENTION

Figure 1:
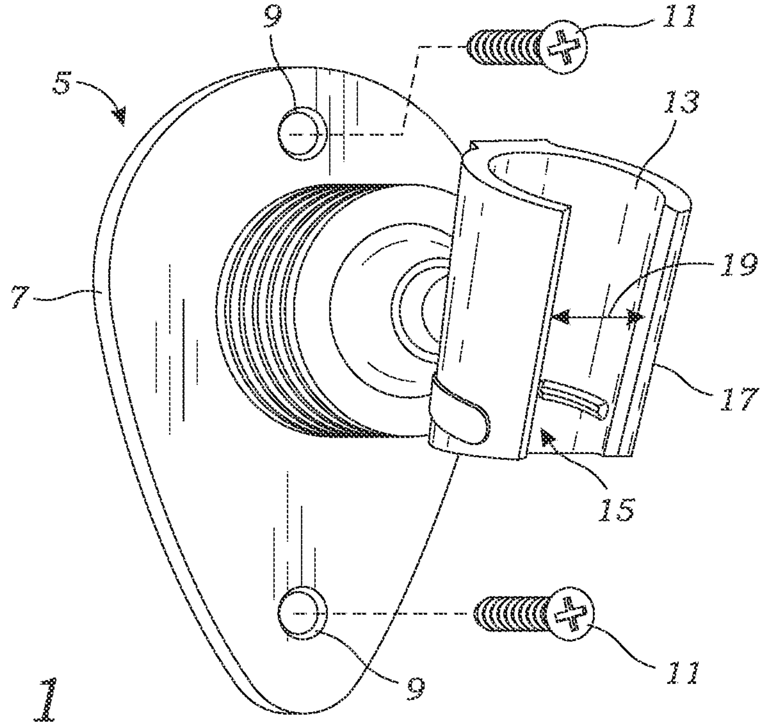
FIG. 1 is a front perspective view of a showerhead mount of the showerhead assembly.

While the present invention is susceptible of embodiment in various forms, as shown in the drawings, hereinafter will be described the presently preferred embodiments of the invention with the understanding that the present disclosure is to be considered as an exemplification of the invention, and it is not intended to limit the invention to the specific embodiments illustrated.

With reference to all FIGS. 1-11, the showerhead assembly 1 includes three primary components including: a handheld showerhead assembly 47, a flexible hose 41, and a mount 5 for holding the handheld showerhead assembly 47. With reference primarily to FIGS. 5-11, the handheld showerhead portion 47 of the showerhead assembly 1 has a relatively traditional construction including a hollow handle 49 having a proximal end 51 which affixes to a flexible hose 41, and a distal end 52 which includes a showerhead 53. The handle 49 includes a longitudinal axis, and preferably the showerhead 53 affixes to the distal end of the handle 47 at an angle, such as 45° to 90°, relative to the handle's longitudinal axis.

The showerhead assembly's primary showerhead 53 has a face 55 through which a plurality of nozzles 57 project. As understood by those skilled in the art, water is capable of flowing through a channel (not shown) within the center of the handle 49 which connects to the showerhead's nozzles 57 which are constructed to spray water. Preferably, but not necessarily, the showerhead includes a controller, such as the controller knob not shown, which is capable of altering the flow of water so as to provide the showerhead with the capability of producing different spray patterns.

Figure 11:
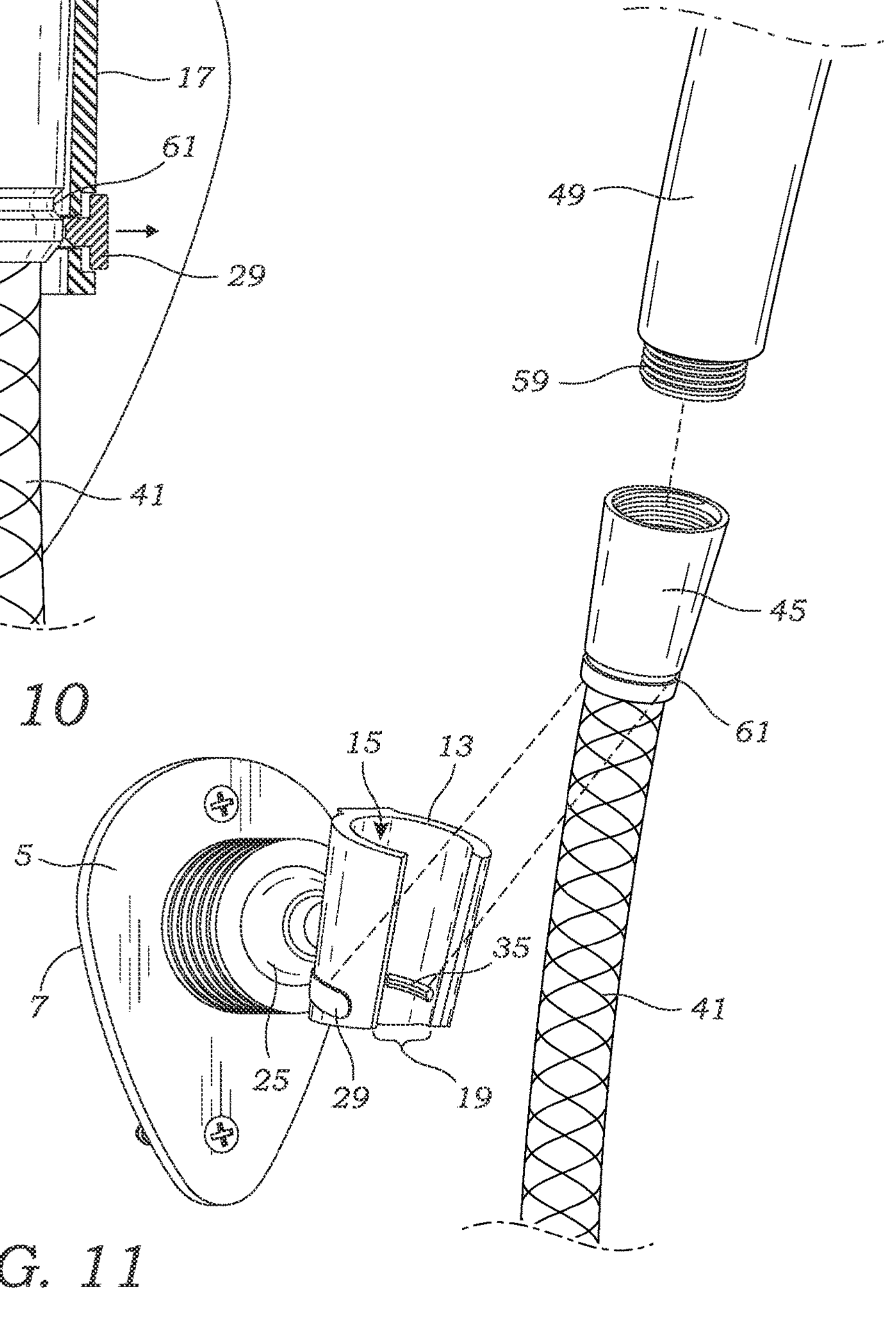
FIG. 11 is a left exploded perspective view of the showerhead assembly.

As illustrated in FIG. 11, preferably the handheld showerhead's hollow handle 49 includes a coupling 45 for connecting to a flexible hose 41. Preferably, the handle 49 has male threads 59 so as to affix to the female threads of the coupling 45. In turn, the coupling 45 connects to the flexible hose 41. The handle 49 further includes a circumferential circular groove 61 near the handle's proximal end 51. Preferably, the thickness of the groove 61 narrows from the exterior of the groove to its interior.

With reference particularly to FIGS. 1-4, the showerhead assembly 1 has a unique mount 5 for holding the showerhead assembly's hollow handle 49 which includes a locking mechanism which impedes inadvertent removal of the handheld showerhead 47. The mount 5 includes a rear mounting surface 7 which engages and affixes to a surface within a shower stall. The mount may affix to the underlying surface using any type of fastener as can be determined by one skilled in the art. As illustrated in the Figures, a preferred fastener includes screws 11 that project through holes 23 in the mounting surface 7, such as to mount to the back wall within a shower stall. Alternatively, where the mount may include a female threaded inlet to affix to a traditional male threaded pipe. For this embodiment not shown, the mount includes an inlet, an outlet and a central conduit to connect a supply water to the showerhead assembly's hose.

Figure 2:
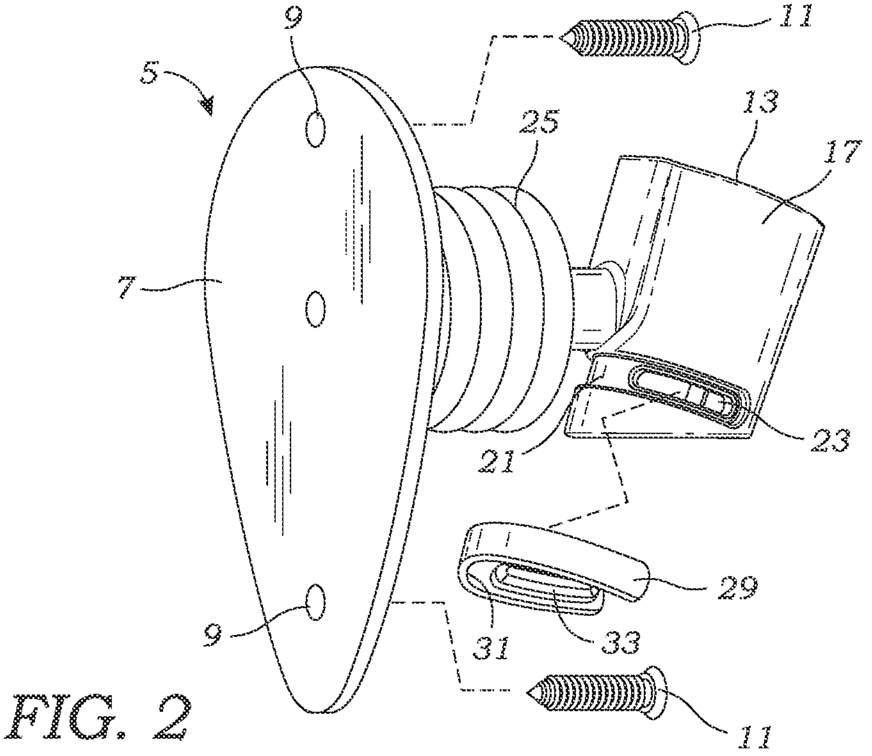
FIG. 2 is a rear left partially exploded view of a showerhead mount of the showerhead assembly.
Figure 3:
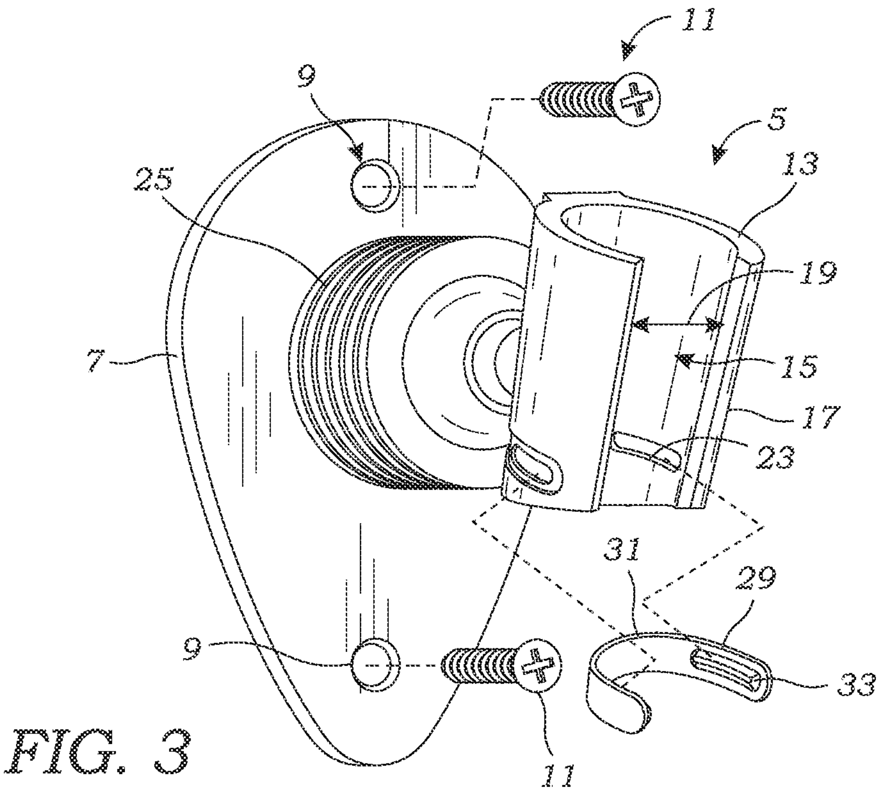
FIG. 3 is a front left and partially exploded view of a showerhead mount of the showerhead assembly.
Figure 4:
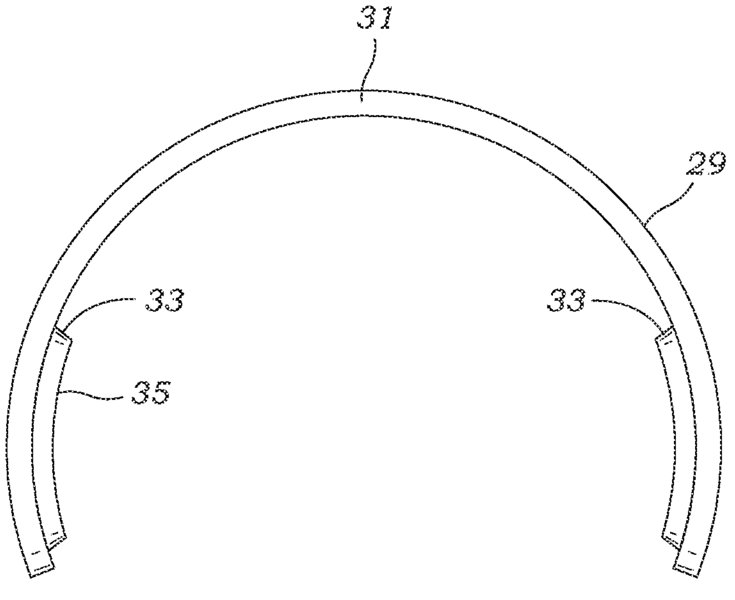
FIG. 4 is a top plan view of the locking clip of the showerhead assembly.
Figure 5:
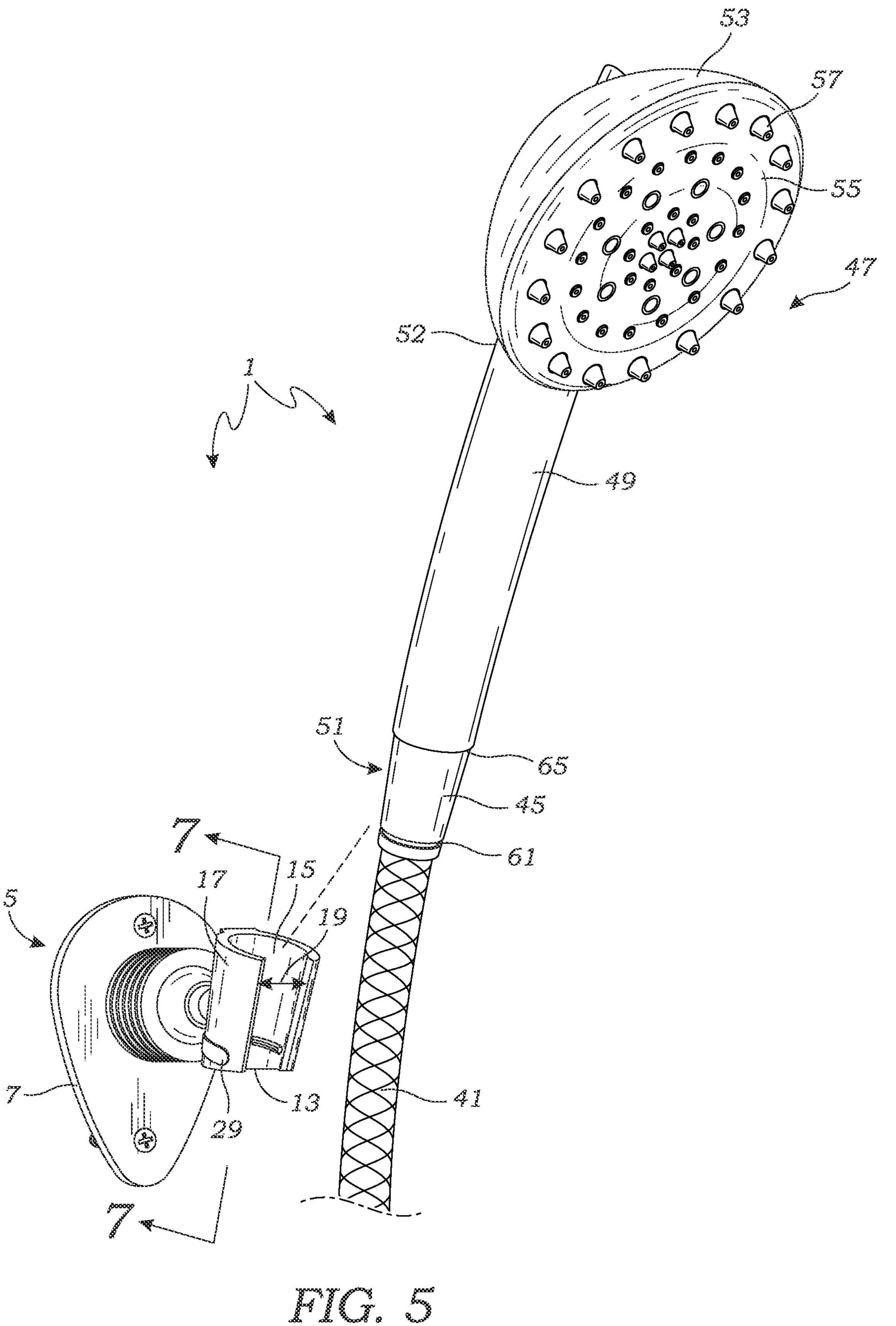
FIG. 5 is a front left perspective view of the showerhead assembly with the handheld showerhead positioned within the mount.
Figure 6:
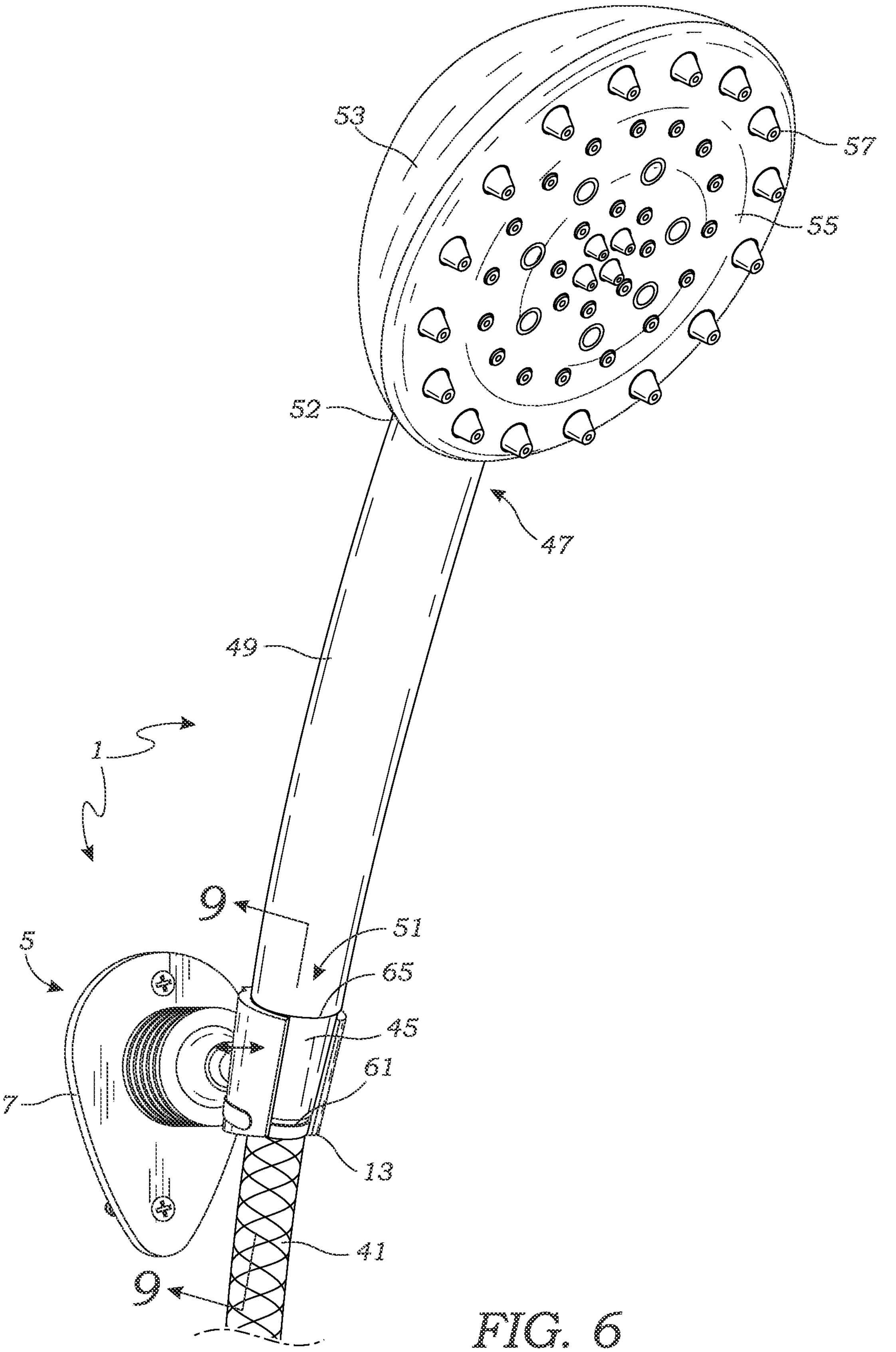
FIG. 6 is a front left perspective view of the showerhead assembly with the handheld showerhead removed from the mount.

The mount 5 further includes a tubular section 13 having an interior region 15 and an exterior surface 17. The tubular section 13 is mechanically connected to the mounting surface 7, preferably by a ball joint 25 which allows the tubular section 13 to rotate and swivel in any direction about the ball joint's center. Preferably, the tubular section's interior 15 tapers downwardly and is sized to receive the proximal end 51 of the showerhead's handle 49. As illustrated in FIG. 5, the tubular section 13 includes an opening 19 that extends vertically the length of the tubular section and has a width sufficient to allow the hose 41 to pass through. With reference particularly to FIGS. 2 and 3, the tubular section 13 includes a slot 21 that extends around most of the circumference of the tubular section with the slot's ends having holes 23 that extend entirely through the tubular section's sidewall.

As shown in FIGS. 1-11, the mount 5 further includes a locking clip 5 that resides within the tubular section's slot 21. The clip includes a body 31 that is substantially "C" shaped and prongs 33 that extend through the tubular section's holes 23 to form engagement surfaces 35. The prongs project entirely through the holes 23 into the tubular section's interior 15 and into the handle's groove 61 when the handheld showerhead 47 is positioned within the mount's tubular section 13. Preferably, the prongs' engagement surfaces 35 are arcuate and have a concave shape with a curvature that is the same as the curvature of the convex shape of the handle's groove 61. Also preferably, the thickness of the prongs 33 diminishes in accordance with the groove's tapered construction. The clip 29 may be made of any flexible material including a soft metal such copper or spring steel. However, preferably the clip 61 is made of a plastic that has a low coefficient of friction and is resistant to fatigue failure, such as an acetal resin.

Figure 9:
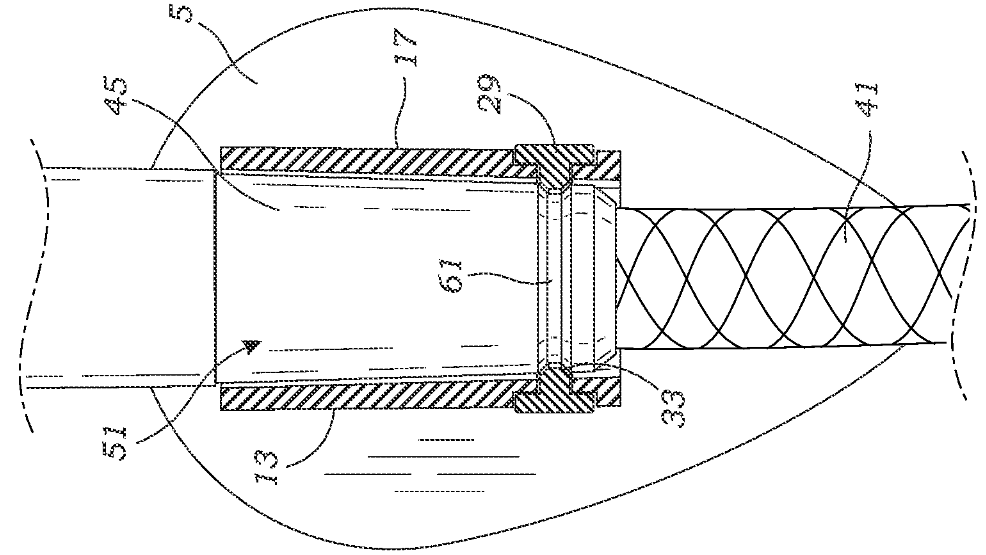
FIG. 9 is a side cutaway view of showerhead assembly as the handheld showerhead positioned within the mount's tubular section as illustrated in FIG. 6.
Figure 8:
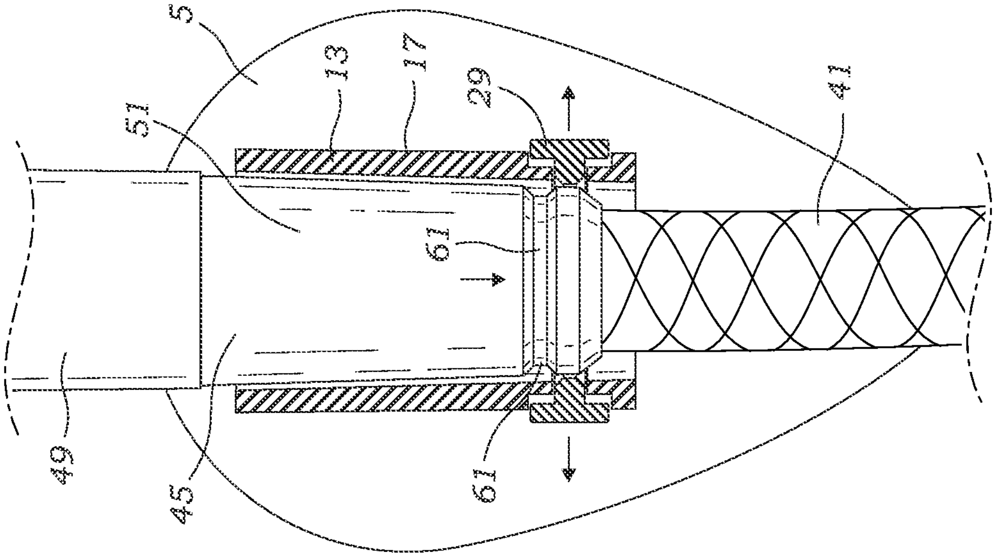
FIG. 8 is a side cutaway view of showerhead assembly as the handheld showerhead is being inserted into the mount's tubular section.
Figure 7:
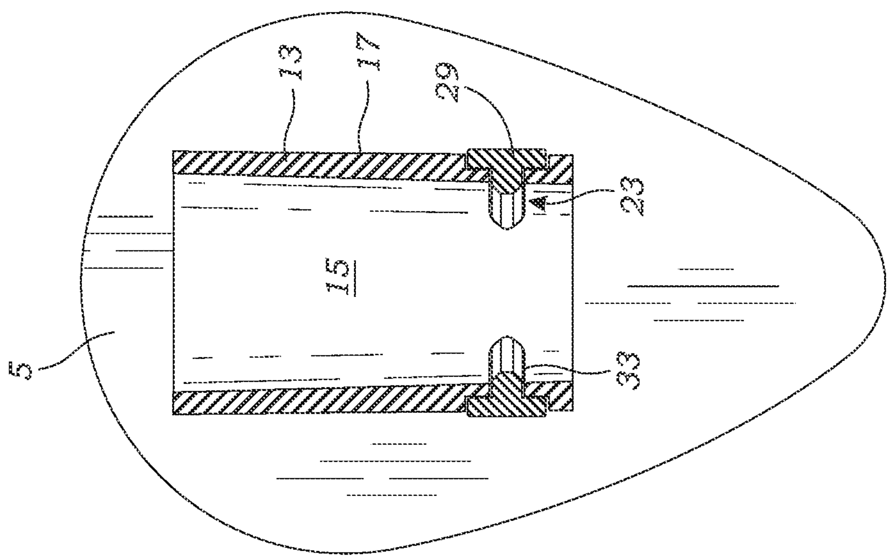
FIG. 7 is a side cutaway view of the mount illustrated in FIG. 5.
Figure 10:
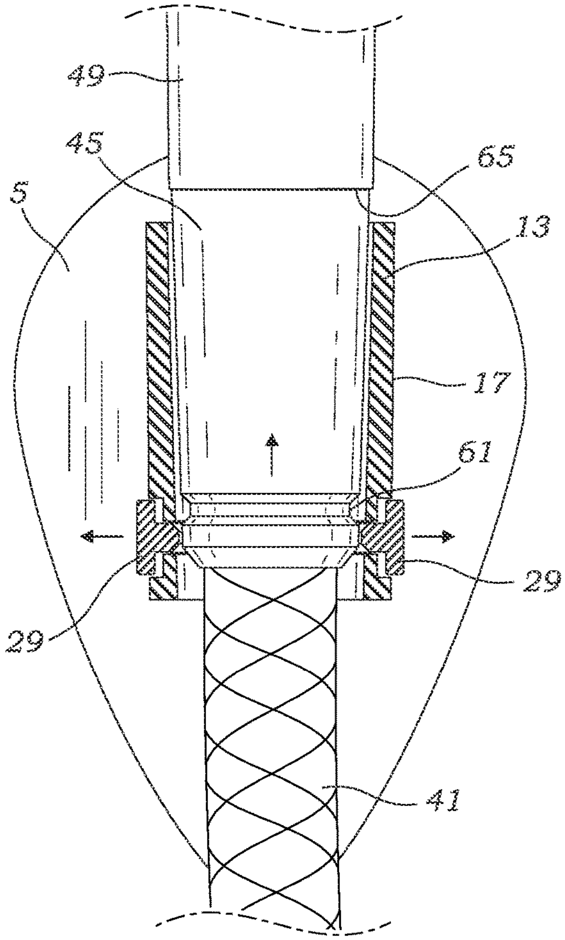
FIG. 10 is a side cutaway view of showerhead assembly as the handheld showerhead is being removed from the mount's tubular section.

With reference to FIGS. 5-10, as the showerhead's handle 49 is inserted into the mount's tubular section's interior 15, the handle's exterior will force the locking clip's prongs 33 to move outwardly (see FIG. 8) until the prongs 33 align with the handle's groove 61. As illustrated in FIG. 9, the locking clip's spring-like properties then cause the prongs 33 to contract inwardly into the handle's groove 61. Once the prongs 33 are in the handle's groove 61, movement of the handheld showerhead is impeded. At this point, the showerhead handle 49 can be manually removed from the tubular section 13, as illustrated in FIG. 10. As the showerhead handle is lifted from the tubular section 13, the engagement of the prongs 33 tapered surfaces against the groove's 61 tapered surface causes the clip's prongs 33 to bias outwardly to permit disengagement of the handheld showerhead 47. However, as illustrated in FIG. 9, prior to removal of the handle from the mount's tubular section, the engagement of the locking clip 29 within the groove 61 impedes inadvertent release of the handheld showerhead 47 unless intentionally initiated by a bather.

The present shower assembly provides an improved mounting structure for securely holding a handheld shower assembly.

Preferred showerhead assemblies have been illustrated and described herein, it will be apparent that various modifications can be made without departing from the spirit and scope of the invention. Accordingly, it will be apparent that various modifications can be made without departing from the spirit and scope of the invention. Therefore, having described my invention in such terms such as to enable a person skilled in the art to understand the invention, recreate the invention and practice it, and having presently identified the presently preferred embodiments thereof, I claim:

The invention claimed is:

1. A handheld showerhead assembly comprising:

a handheld showerhead including a showerhead and an elongate hollow handle, said showerhead having a front face and a plurality of nozzles projecting from said front face, said elongate hollow handle having a distal end affixed to said showerhead and a tapered proximal end having a circumferential groove that extends around said handle's proximal end, said handheld showerhead further including a channel connecting said hollow handle's proximal end to said nozzles for transporting water received from said handle's proximal end to said nozzles;

a flexible hose having first and second ends with said first end being connected to said elongate handle's proximal end;

a showerhead mount including a rear mounting surface and a vertically extending tubular section that is tapered and sized to receive said handheld showerhead's tapered proximal end, said tubular section including a vertical extending opening sized to allow said hose to pass from exterior of said tubular section to interior within said tubular section, said vertical extending opening giving said tubular section a "C" shaped cross-section;

said tubular section including a circumferential slot which extends around the exterior of said tubular section, and said tubular section including two holes which project entirely through tubular section at the ends of said circumferential slot; and a locking clip which inhibits the removal of said elongate handle from within said tubular section, said locking clip being substantially "C" shaped and sized to reside within said circumferential slot, said locking clip including two prongs with each of said prongs extending through one of said holes into said interior of said tubular section to end at an engagement surface, said circumferential slot and said locking clip positioned so that said prongs project into said handle's groove when said elongate handle is positioned within said tubular section, and said locking clip made of a flexible material so as to flex outwardly if the proximal end of handle is inserted or removed from said tubular section's interior.

2. The showerhead assembly of claim 1 wherein said handle's groove is circular about said elongate handle and has a radius, and said prong's engagement surface is concave and has a radius of curvature that is the same as said handle groove's radius.

3. The showerhead assembly of claim 1 wherein said handle's groove tapers inwardly toward the center of said handle and said prong's engagement surfaces taper inwardly to fill said groove when said handle is positioned within the tubular section of the showerhead mount.

4. The showerhead assembly of claim 1 wherein said handle's proximal end includes a coupling for connecting said hose to said handheld showerhead, said coupling includes a fastener for selectively connecting or disconnecting said hose to said handheld showerhead, and said coupling includes said circumferential groove.

5. The showerhead assembly of claim 4 wherein said coupling's fastener is a threaded fastener.

6. The showerhead assembly of claim 1 wherein said locking clip is made of plastic.

7. The showerhead assembly of claim 1 wherein said locking clip is made of acetal resin.

* * * * *